(12) United States Patent
Chung et al.

(10) Patent No.: US 11,532,110 B2
(45) Date of Patent: *Dec. 20, 2022

(54) FAST IMAGE STYLE TRANSFERS

(71) Applicant: Snap Inc., Santa Monica, CA (US)

(72) Inventors: Jaewook Chung, Mountain View, CA (US); Emre Yamangil, San Francisco, CA (US); Wisam Dakka, San Francisco, CA (US); Aymeric Damien, San Francisco, CA (US); Emre Yamangil, San Francisco, CA (US); Chunhui Zhu, Burlingame, CA (US)

(73) Assignee: Snap, Inc.

( * ) Notice: Subject to any disclaimer, the term of this patent is extended or adjusted under 35 U.S.C. 154(b) by 120 days.

This patent is subject to a terminal disclaimer.

(21) Appl. No.: 16/923,563

(22) Filed: Jul. 8, 2020

(65) Prior Publication Data

US 2020/0334883 A1 Oct. 22, 2020

Related U.S. Application Data

(63) Continuation of application No. 15/833,733, filed on Dec. 6, 2017, now Pat. No. 10,740,939.

(60) Provisional application No. 62/432,463, filed on Dec. 9, 2016.

(51) Int. Cl.
*G06T 11/60* (2006.01)
*G06N 3/04* (2006.01)
*G06V 30/194* (2022.01)
*G06F 16/51* (2019.01)

(52) U.S. Cl.
CPC ............... *G06T 11/60* (2013.01); *G06N 3/04* (2013.01); *G06V 30/194* (2022.01); *G06F 16/51* (2019.01)

(58) Field of Classification Search
CPC ........ G06T 11/60; G06V 30/194; G06N 3/04; G06F 16/51
See application file for complete search history.

(56) References Cited

U.S. PATENT DOCUMENTS

| | | | |
|---|---|---|---|
| 5,754,939 | A | 5/1998 | Herz et al. |
| 6,038,295 | A | 3/2000 | Mattes |
| 6,158,044 | A | 12/2000 | Tibbetts |
| 6,167,435 | A | 12/2000 | Druckenmiller et al. |
| 6,205,432 | B1 | 3/2001 | Gabbard et al. |

(Continued)

FOREIGN PATENT DOCUMENTS

| | | |
|---|---|---|
| CA | 2887596 A1 | 7/2015 |
| WO | WO-2012000107 A1 | 1/2012 |

(Continued)

OTHER PUBLICATIONS

"U.S. Appl. No. 15/833,733, Examiner Interview Summary dated Feb. 27, 2020", 3 pgs.

(Continued)

*Primary Examiner* — Qun Shen
(74) *Attorney, Agent, or Firm* — Schwegman Lundberg & Woessner, P.A.

(57) ABSTRACT

Manipulating images using computationally expensive machine learning schemes can be implemented using server-generated models of the machine learning schemes that are transmitted to a client device for application. The schemes can include convolutional neural networks having a kernel comprising a plurality of low-rank matrices.

20 Claims, 15 Drawing Sheets

(56) References Cited

U.S. PATENT DOCUMENTS

| | | |
|---|---|---|
| 6,310,694 B1 | 10/2001 | Okimoto et al. |
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,703,140 B2 | 4/2010 | Nath et al. |
| 7,912,896 B2 | 3/2011 | Wolovitz et al. |
| 8,131,597 B2 | 3/2012 | Hudetz |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,418,249 B1 * | 4/2013 | Nucci .................. G06F 21/552 709/225 |
| 8,570,907 B2 | 10/2013 | Garcia, Jr. et al. |
| 8,718,333 B2 | 5/2014 | Wolf et al. |
| 8,724,622 B2 | 5/2014 | Rojas |
| 8,745,132 B2 | 6/2014 | Obradovich |
| 8,874,677 B2 | 10/2014 | Rosen et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,264,463 B2 | 2/2016 | Rubinstein et al. |
| 9,276,886 B1 | 3/2016 | Samaranayake |
| 9,294,425 B1 | 3/2016 | Son |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,443,227 B2 | 9/2016 | Evans et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,715,508 B1 * | 7/2017 | Kish ..................... G06V 20/10 |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 10,115,040 B2 | 10/2018 | Brauer |
| 2002/0024593 A1 | 2/2002 | Bouguet et al. |
| 2002/0047868 A1 | 4/2002 | Miyazawa |
| 2002/0144154 A1 | 10/2002 | Tomkow |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0198128 A1 | 9/2005 | Anderson |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0042588 A1 | 2/2009 | Lottin et al. |
| 2009/0132453 A1 | 5/2009 | Hangartner et al. |
| 2010/0082427 A1 | 4/2010 | Burgener et al. |
| 2010/0131880 A1 | 5/2010 | Lee et al. |
| 2010/0185665 A1 | 7/2010 | Horn et al. |
| 2010/0306669 A1 | 12/2010 | Della Pasqua |
| 2011/0099507 A1 | 4/2011 | Nesladek et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0194301 A1 | 8/2013 | Robbins et al. |
| 2013/0290443 A1 | 10/2013 | Collins et al. |
| 2014/0032682 A1 | 1/2014 | Prado et al. |
| 2014/0122787 A1 | 5/2014 | Shalvi et al. |
| 2014/0201527 A1 | 7/2014 | Krivorot |
| 2014/0282096 A1 | 9/2014 | Rubinstein et al. |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0130799 A1 * | 5/2015 | Holzer ............... H04N 5/23238 345/420 |
| 2015/0199082 A1 | 7/2015 | Scholler et al. |
| 2015/0227602 A1 | 8/2015 | Ramu et al. |
| 2016/0012592 A1 | 1/2016 | Chou et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0180887 A1 | 6/2016 | Sehn |
| 2016/0277419 A1 | 9/2016 | Allen et al. |
| 2016/0321708 A1 | 11/2016 | Sehn |
| 2016/0359957 A1 | 12/2016 | Laliberte |
| 2016/0359987 A1 | 12/2016 | Laliberte |
| 2016/0364625 A1 * | 12/2016 | Lin ........................ G06T 7/90 |
| 2017/0011280 A1 * | 1/2017 | Soldevila ............. G06V 10/454 |
| 2017/0032222 A1 * | 2/2017 | Sharma ................ G06K 9/6232 |
| 2017/0140538 A1 * | 5/2017 | Zhang ..................... G06T 7/37 |

(56) References Cited

U.S. PATENT DOCUMENTS

| | | | |
|---|---|---|---|
| 2017/0161382 | A1 | 6/2017 | Ouimet et al. |
| 2017/0263029 | A1 | 9/2017 | Yan et al. |
| 2017/0287006 | A1 | 10/2017 | Azmoodeh et al. |
| 2017/0295250 | A1 | 10/2017 | Samaranayake et al. |
| 2017/0323481 | A1* | 11/2017 | Tran .......... H04N 5/23219 |
| 2017/0374003 | A1 | 12/2017 | Allen et al. |
| 2017/0374508 | A1 | 12/2017 | Davis et al. |

FOREIGN PATENT DOCUMENTS

| | | |
|---|---|---|
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |

OTHER PUBLICATIONS

"U.S. Appl. No. 15/833,733, Final Office Action dated Dec. 13, 2019", 11 pgs.

"U.S. Appl. No. 15/833,733, Non Final Office Action dated May 3, 2019", 17 pgs.

"U.S. Appl. No. 15/833,733, Notice of Allowance dated Apr. 1, 2020", 13 pgs.

"U.S. Appl. No. 15/833,733, Response filed Feb. 27, 2020 to Final Office Action dated Dec. 13, 2019", 15 pgs.

"U.S. Appl. No. 15/833,733, Response filed Oct. 3, 2019 to Non-Final Office Action dated May 3, 2019", 12 pgs.

"Google Scholar Search Results", patents.google.com, (Retrieved by the Examiner on Mar. 25, 2020), 6 pgs.

Castelluccia, Claude, et al., "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Vaas, Lisa, "StealthText, Should You Choose to Accept It", [Online] Retrieved from the Internet: <URL: http://www.eweek.eom/print/c/a/MessagingandCollaboration/StealthTextShouldYouChoosetoAcceptIt>, (Dec. 13, 2005), 2 pgs.

U.S. Appl. No. 15/833,733, U.S. Pat. No. 10,740,939, filed Dec. 6, 2017, Fast Image Style Transfers.

* cited by examiner

— 1 —

FAST IMAGE STYLE TRANSFERS

RELATED APPLICATIONS

This application is a continuation of U.S. patent application Ser. No. 15/833,733, entitled "Fast Image Style Transfers," filed on Dec. 6, 2017, which claims the priority benefit of U.S. Provisional Application Ser. No. 62/432,463, entitled "Complex Image Stylization for Mobile Devices," filed on Dec. 9, 2016, each of which is hereby incorporated by reference in their entireties.

TECHNICAL FIELD

Embodiments of the present disclosure relate generally to image processing and, more particularly, but not by way of limitation, to performing image processing using machine learning.

BACKGROUND

Increasingly, users use their mobile client devices to capture and share images on different network platforms (e.g., social media network sites). The mobile client devices have limited computing resources (e.g., lower power hardware processors, limited memory) and cannot efficiently execute complex image processing processes, such as execute a convolutional neural network to perform style transfers.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed above, client-side complex imaging manipulations, e.g., neural network-based style transfers, are not practical because processing the complex imaging schemes results in long processing times and a poor user experience. To this end, a style transfer system can capture an image on a client device and perform complex image manipulations in the background as the user browses other areas of a given application or other applications. The complex image manipulations may include style transfers implemented by a convolutional neural network that has been configured to execute efficiently on a client device. For example, a user may capture an image of the user (e.g., a selfie) and initiate a process to convert the image of the user in the style of Van Gogh's Starry Night. In some embodiments, as soon as the image is captured a complex neural network performs style operations before the user requests them. That is, the user may capture the image and store it for later viewing or browse to other areas of the imaging application. While the user browsing, a complex neural network runs in the background and performs style transfers to change the style of the image of the user to the style of Van. Gogh's Starry Night. A thumbnail can be presented to the user showing the user's image in the style of Starry Night. The user can select the image and the stylized image instantly is shown on screen with little to no delay. In this way, by performing complex neural network processes in the background using efficient processes, complex image processing can be completed in a way that enhance user experience (e.g., with little to no wait time). The user can then more rapidly view a stylized version of an image he/she recently captured and quickly post the stylized image as an ephemeral message on a social media application.

Figure 1:
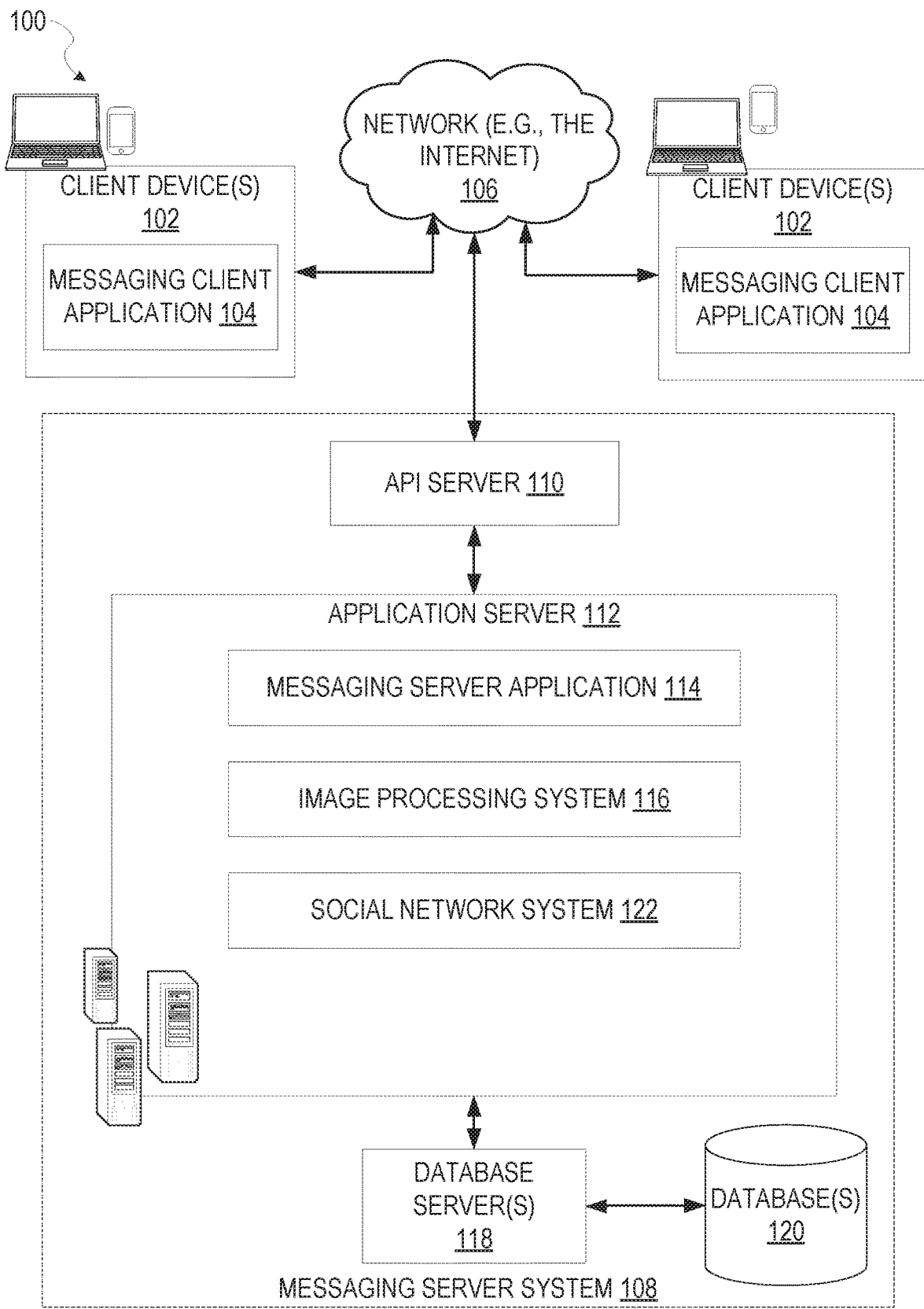
FIG. 1 is a block diagram showing an example messaging system for exchanging data (e.g., messages and associated content) over a network.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, and a social network system 122. The messaging server application 114 implements a number of message-processing technologies and functions particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user.

The application server 112 is communicatively coupled to a database server 118, which facilitates access to a database 120 in which is stored data associated with messages processed by the messaging server application 114.

Figure 2:
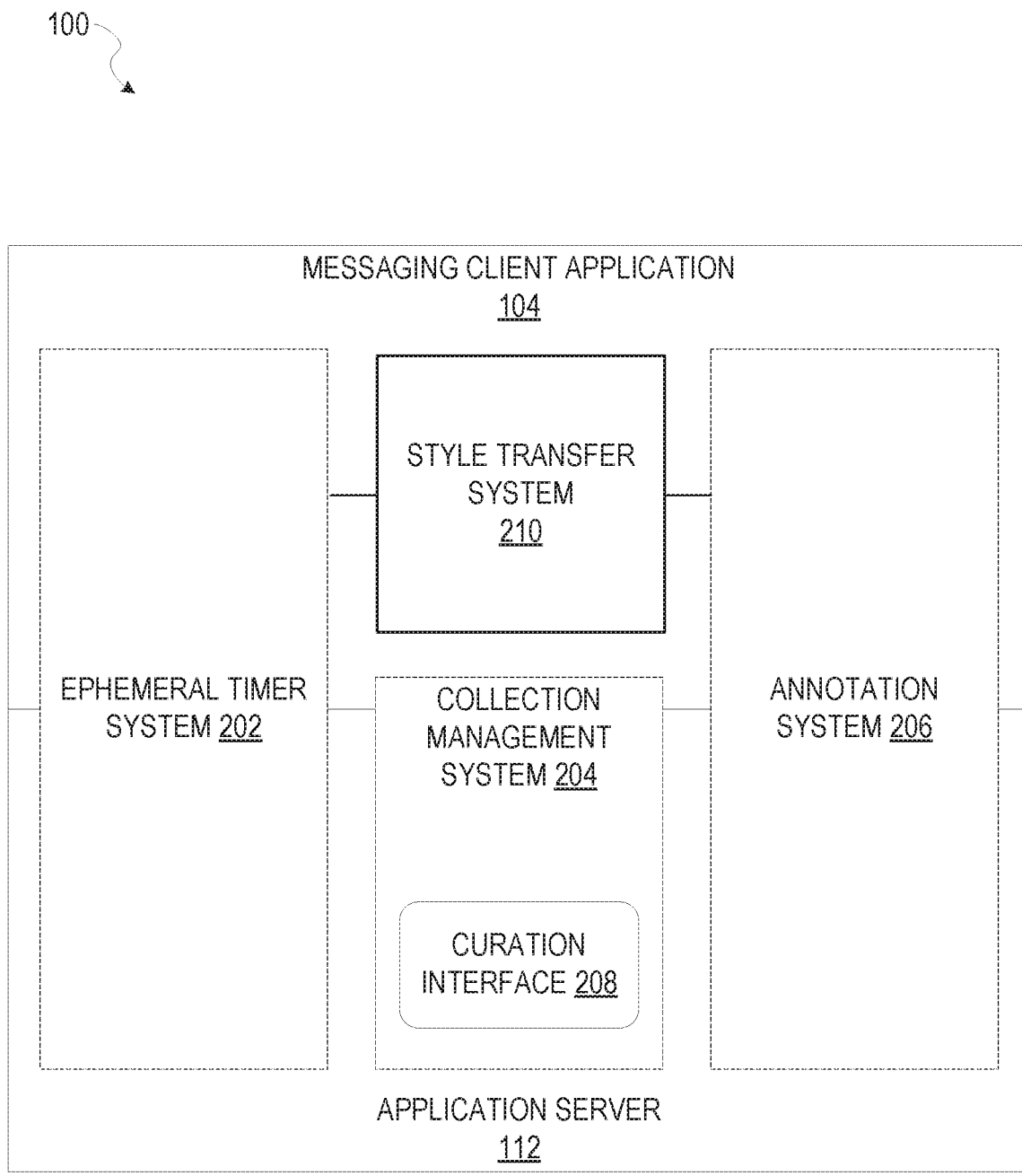
FIG. 2 is block diagram illustrating further details regarding a messaging system having an integrated virtual object machine learning system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and a style transfer system 210.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a SNAPCHAT Story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT Geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The image mask system 210 manages generating image masks (e.g., pixel masks) for images (e.g., images tracked in image table 308 discussed below). The image masks can be used by the messaging client application 104 to produce visual effects on a depicted human subject. For example, the annotation system 206 can use the mask to apply different filters to different labeled areas using the mask.

Figure 3:
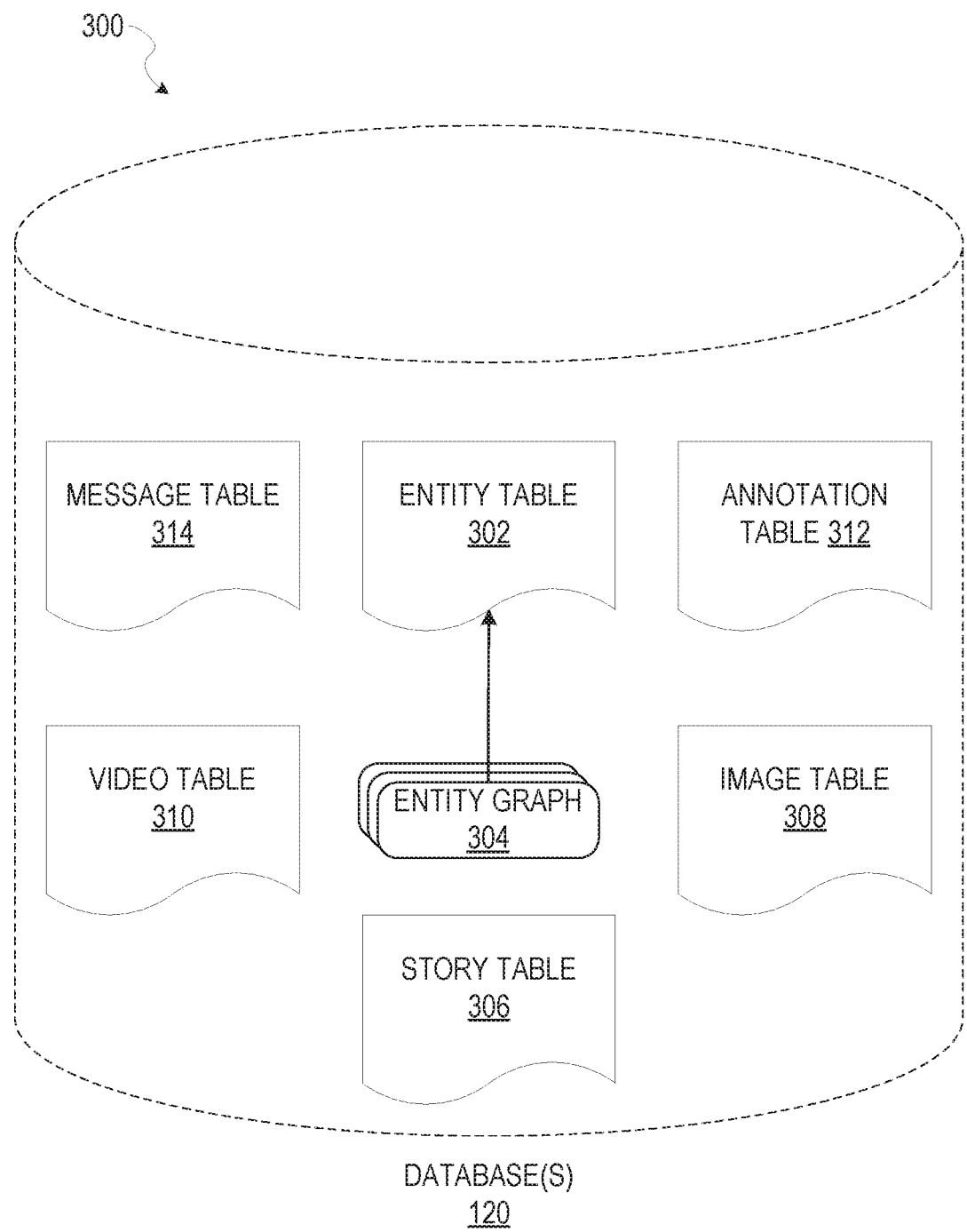
FIG. 3 is a schematic diagram illustrating data that may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT Story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
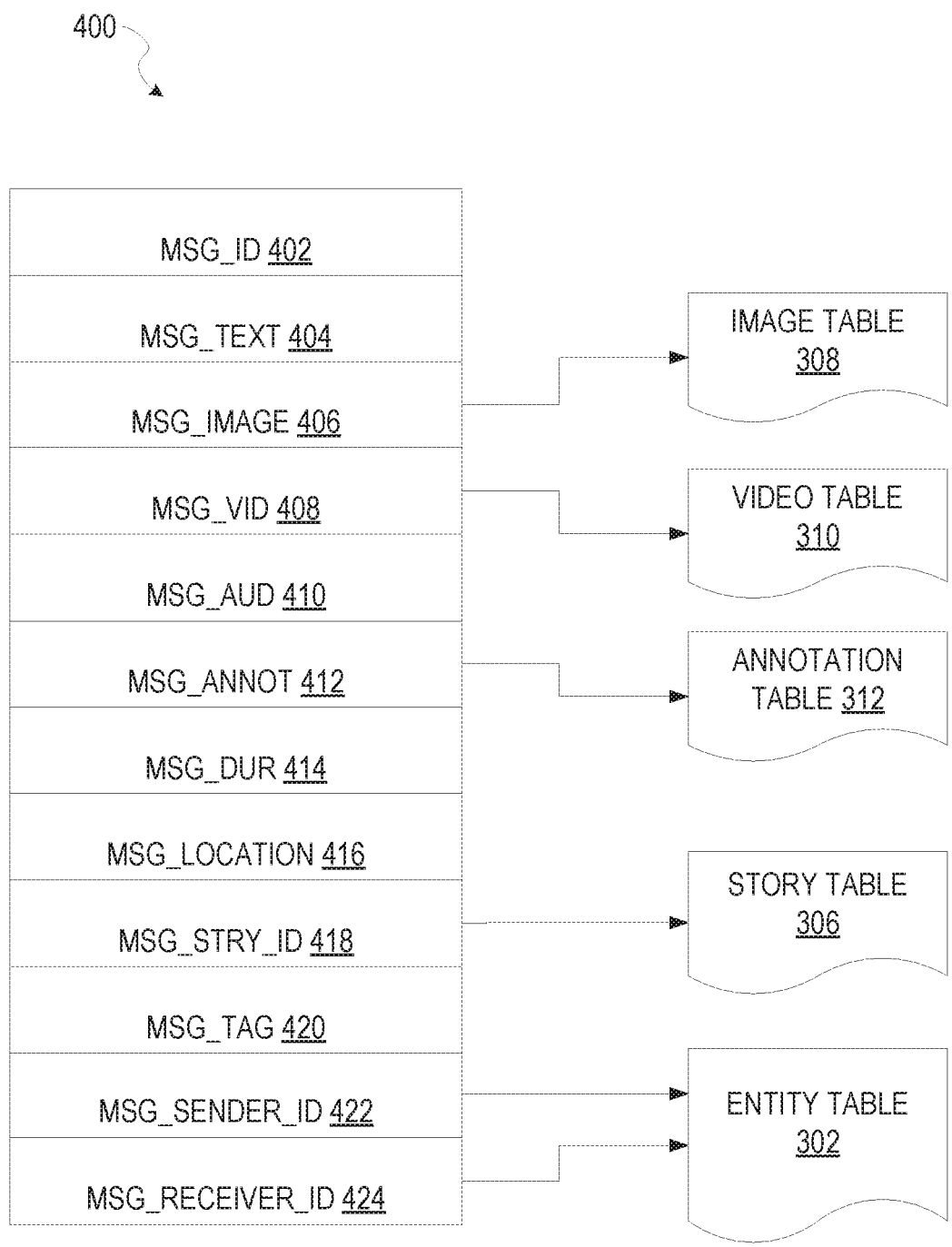
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102, and that is included in the message 400.

A message image payload 406: image data captured by a camera component of a client device 102 or retrieved from memory of a client device 102, and that is included in the message 400.

A message video payload 408: video data captured by a camera component or retrieved from a memory component of the client device 102, and that is included in the message 400.

A message audio payload 410: audio data captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: identifies values identifying one or more content collections (e.g., "stories") with which a particular content item in the message image payload. 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
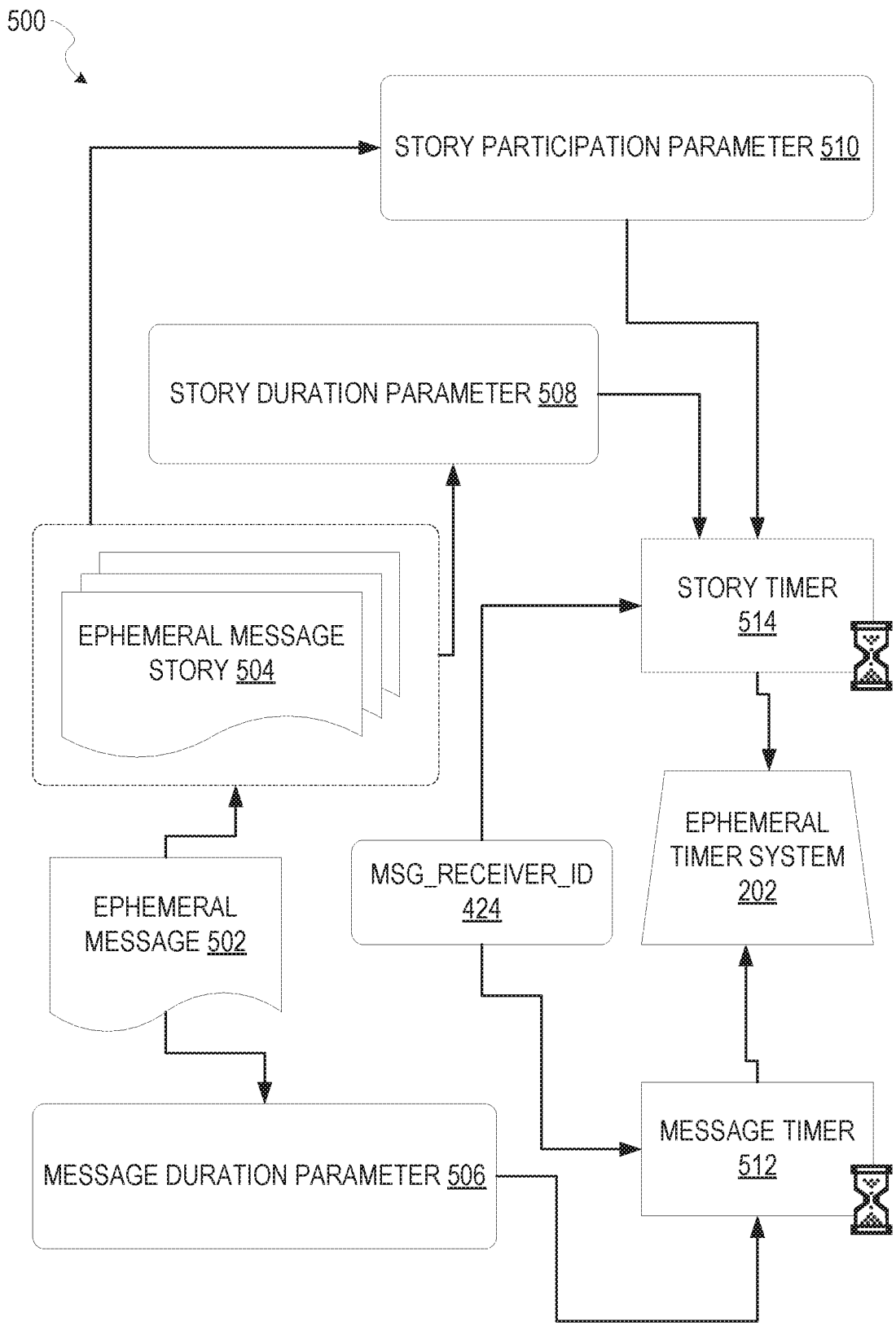
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral tinier system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT Story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a farther embodiment, a certain ephemeral message 502 may expire, within the context of the ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
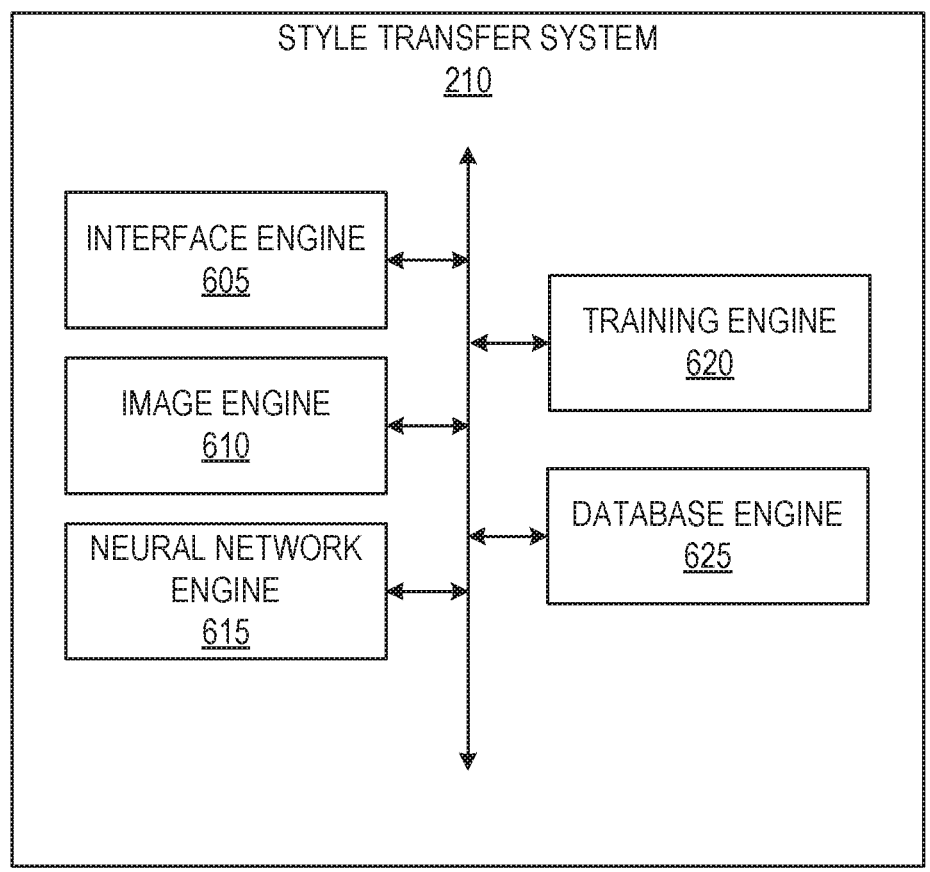
FIG. 6 illustrates a block diagram showing components provided within the style transfer system, according to some embodiments.

FIG. 6 illustrates a block diagram showing components provided within the style transfer system 210, according to some embodiments. In various example embodiments, the style transfer system 210 comprises an interface engine 605, an image engine 610, a neural network engine 615, a training engine 620, and a database engine 625. The components themselves are communicatively coupled (e.g., via appropriate interfaces) to each other and to various data sources, so as to allow information to be passed between the applications or so as to allow the applications to share and access common data. Furthermore, the components access one or more databases, e.g., database 120, via the database servers, e.g., database server 124, according to some example embodiments. The interface engine 605 manages generating user interfaces for display on a display screen of the client device 102. The image engine 610 manages capturing images using an image sensor (e.g., camera) of the client device 102. In some embodiments, the image engine 610 is configured to identify images generated on other devices (e.g., devices other than client device 102) and import the images for style transfer processing. The neural network engine 615 is responsible for implementing one or more neural networks, such as a convolutional neural network, to perform modifications to an image's visual appearance. In some example embodiments, the neural network engine 615 implements a CNN to perform a style transfer on an image captured using a camera of the client device 102.

The training engine 620 is responsible for training the neural networks implemented in the neural network engine 615. For example, the training engine 620 can be configured to adjust weights in the neural networks to minimize a loss function used in stylization of images. The database engine 625 is responsible for storing and retrieving data from local memory or from a database, such as database 126.

Figure 7:
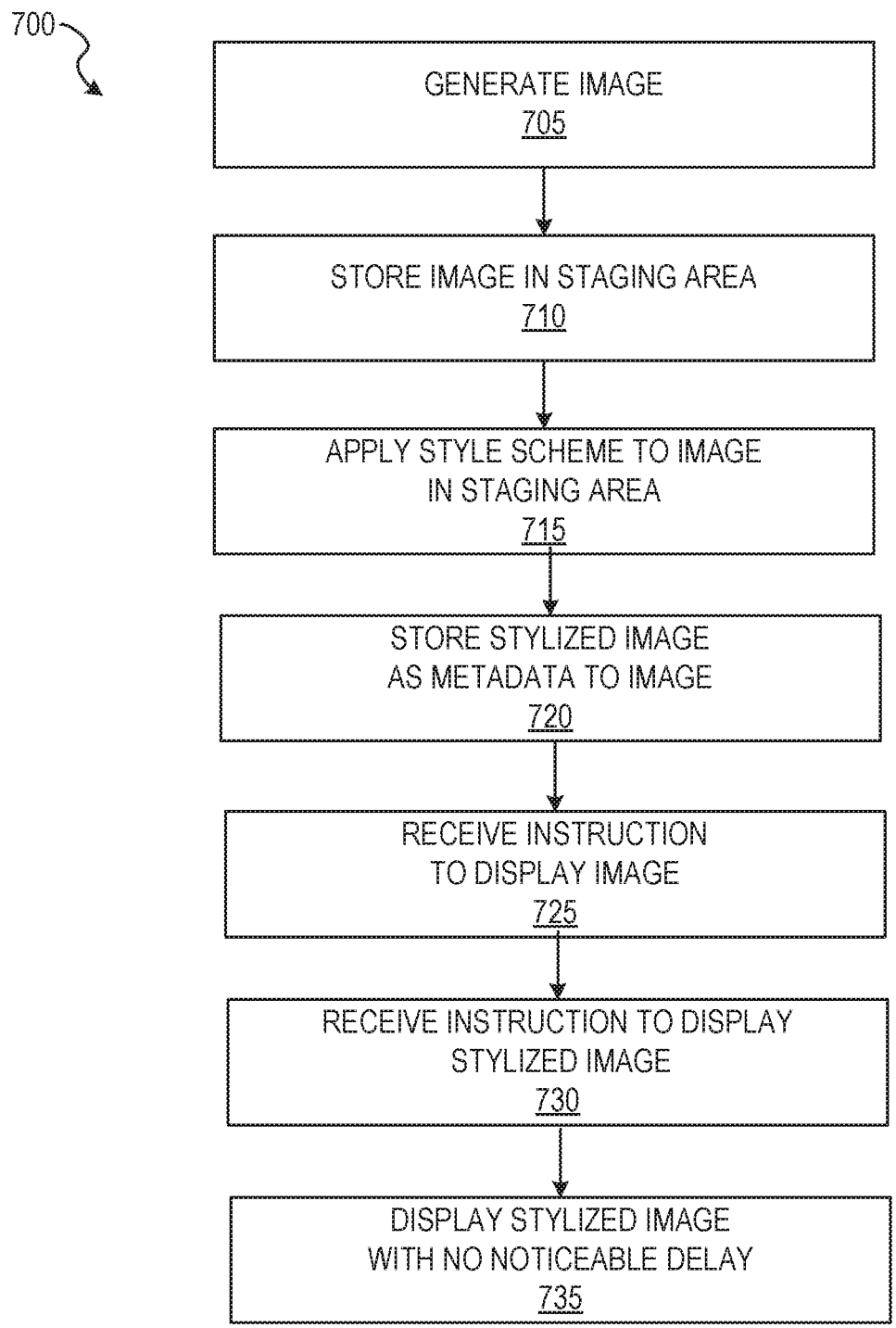
FIG. 7 shows a flow diagram of a method for generating stylized images, according to some example embodiments.

FIG. 7 shows a flow diagram of a method 700 for generating stylized images, according to some example embodiments. At operation 705, the image engine 610 generates an image, e.g., using an image sensor of the client device 102. At operation 710, the image engine 610 stores the image in a staging area in local memory of the client device 102. For example, the staging area may be an image album or gallery that can be accessed at later times, e.g., when the user wants to view the capture image. At operation 715, the neural network engine 615 generates a stylized image by applying a style scheme to the generated image stored in the staging area. In some cases, performing CNN-based stylization on a client device is often impractical due to the complexity of CNN-based stylization, and the relatively low computational resources of client devices. To avoid making a user wait, at operation 715 the neural network engine 615 automatically applies CNN-based stylization to images stored in the staging area. The CNN-based stylization can be completed as a background process (e.g., when using the CPU will not cause noticeable lag). In this way, the user can access other screens of messaging client application 104 or other applications on the client device 102. In some example embodiments, CNN-based stylization is performed using specially configured convolutional neural networks that use low-rank matrices and specified parameters such as stride and resizing, as discussed in further detail below.

At operation 720, the neural network engine 615 stores the stylized image as metadata to the image data of the image in the staging area. At operation 725, the interface engine 605 receives an instruction from a user (e.g., user of client device 102) to display the image in the staging area. Upon the image being displayed in the staging area, the metadata is used to display options (e.g., buttons) to the user indicating that the image has been stylized. The display options may be thumbnails showing the stylized image. At operation 730, the interface engine 605 receives an instruction to display the stylized image. For example, the user selected a button showing the image in stylized form. At operation 735, the interface engine 605 accesses the metadata and displays the stylized image with no noticeable delay (e.g., within one second). To the user it appears as if complex stylization was performed on-the-fly, when in fact the stylization was applied by the neural network engine 615 as a background process on the client device 102 when the image was input into the staging area. Although only one stylization image option is discussed, it is appreciated that the neural network engine 615 can apply many styles to the image. For example, the neural network engine 615 can include a first CNN trained to apply a Van Gogh style to an image, a second CNN trained to apply a Kandinsky style to the same image, and so on. In this way, when the user views the image, he/she can quickly scroll through different stylizations of the recently captured image with little to no delay.

Figure 8:
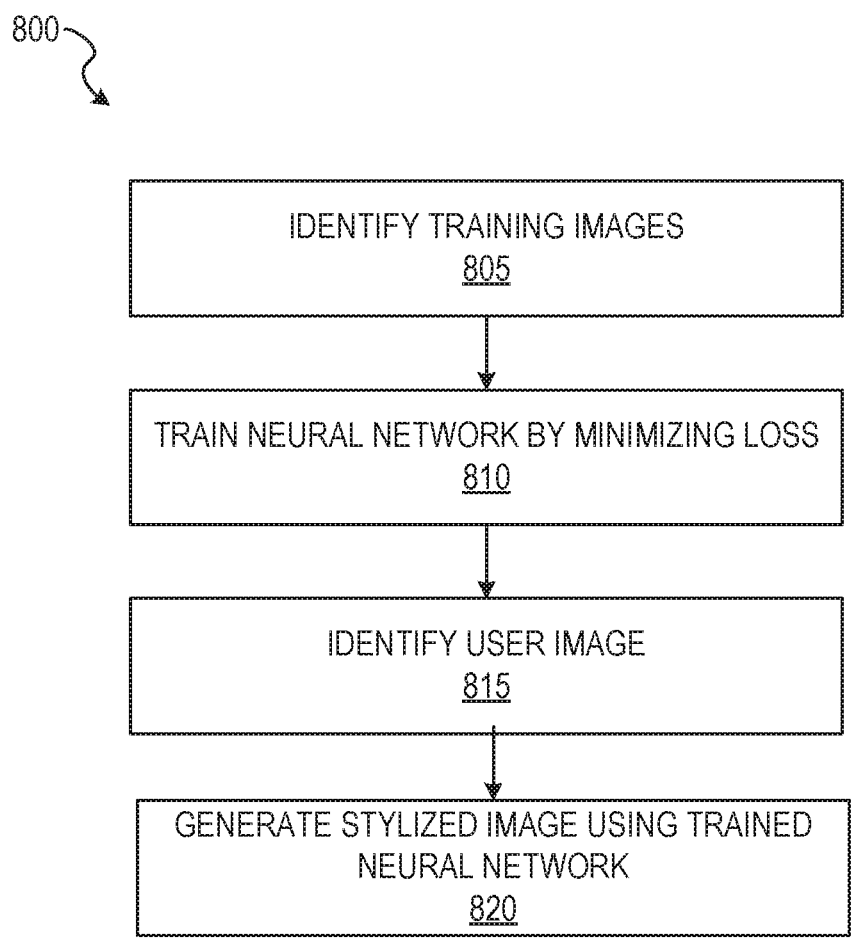
FIG. 8 shows a flow diagram of a method for training a neural network, according to some example embodiments

FIG. 8 shows a flow diagram of a method 800 for training a neural network, according to some example embodiments. At operation 805, the training engine 620 identifies training image data files. At operation 810, the training engine 620 trains a convolutional neural network using the training image data files. In some example embodiments, training the convolutional neural networks is performed by minimizing a style loss function using the stylized training image files. At operation 815, the neural network engine 615 identifies a user image. For example, the user image can be an image generated by the image engine 610. At operation 820, the neural network engine 615 uses the trained convolutional neural networks to process the user image to generate a stylized version of the user image.

Figure 9:
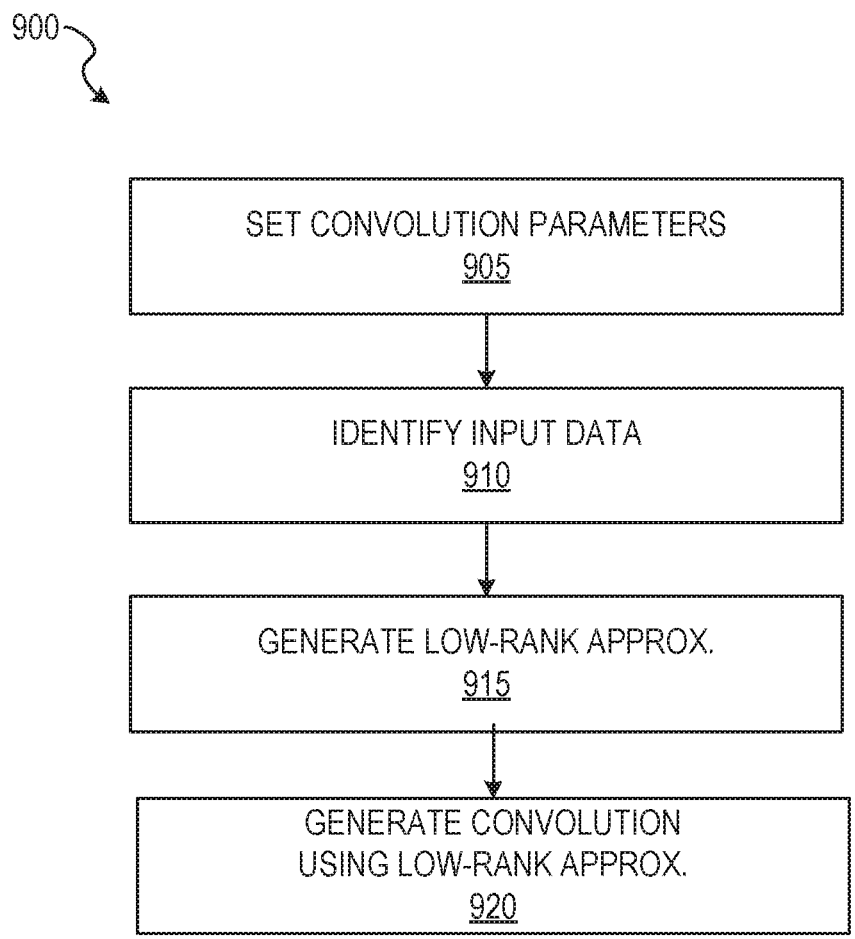
FIG. 9 shows a flow diagram of a method for implementing a neural network for efficiently generating stylized images, according to some example embodiments.

FIG. 9 shows a flow diagram of a method 900 for implementing a neural network for efficiently generating stylized images, according to some example embodiments. At operation 905, the neural network engine 615 sets convolution parameters for use by the convolution operator in the convolutional neural network. In some example embodiments, the convolutional parameters set at operation 905 include setting the stride settings to stride one convolution. Further, in some example embodiments, the input images are resited to half the size e.g., 2× resize, from 256×256 pixels to 128×128 pixels). At operation 910, the neural network engine 615 identifies input data to input into the convolutional neural network. For example, the neural network engine 615 identifies the image generated by the user using the image engine 610. At operation 915, the neural network engine 615 generates a low-rank matrix approximation of the convolution operator. In some example embodiments, the low-rank matrix approximation of the convolution operator enables the client device to use a convolutional neural network to generate stylized images with fast inference speed, compact model size, and low energy consumption. This new approach enables fast convolution based stylization using efficient approximations of tensor projections to significantly reduce the computational time of the convolution operator.

In particular, for example, suppose the input tensor is $X \in R^{H \times W \times I}$ where H and W denote, respectively, the height and width of the tensor, and I denotes the number of input channels. In some example embodiments, X is the input data which can be pre-processed, or the output of a fully connected neural network (e.g., a REctified Linear Unit (RELU)). Thus, without loss of generality: X≥0. In addition, let convolution kernel be configured as: $Y \in R^{N \times D \times D \times I}$, where N denotes the number of kernel output channels. In those example embodiments, the convolution method (e.g., TensorFlow® convolution operator) proceeds as follows:

(1) Flatten the kernel to a 2-D matrix with shape [H*W*I, O];

(2) Extract image patches from the input tensor to form a virtual tensor of shape [out_height, out_width, H*W*I];

(3) For each patch, right-multiply the filter matrix and the image patch vector.

In some example embodiments, the convolutional kernel is larger than zero, e.g., Y≥0, and can be represented using a set of separable rank-1 matrices, which enables efficient matrix completion techniques that are executable on a client device, e.g., client device 102. As a result, the convolution can be computed significantly more efficiently than existing approaches. Further, when Y≥0, we know that the convolution output Z=Y∘X also satisfies Z≥0, so a non-negative bias term is used in the following ReLU layers.

Further consider the convolution operator for an interior point (i, j) and output channel n. The resulting value Z(n, i, j) can be computed as the following sum of I-dimensional real-valued dot products:

$$Z(n, i, j) = \sum_{d1=0}^{D-1} \sum_{d2=0}^{D-1} < X(i+d1, j+d2, \cdot), Y(n, d1, d2, \cdot) > \quad (1)$$

in the convolutional operator, all of the above dot products need to be computed explicitly which creates the need for significant computational resources, including computing architectures such as GPUs and TPUs. According to some example embodiments, the convolution is directed by computing only a small sample of all dot products in equation (1). This can be achieved by introducing additional structure into the convolutional kernel Y. More specifically, consider a bijective function $$\Pi: R^{D \times D \times I} \to R^{(D \cdot D) \times I} \quad (2)$$

Then, for each output channel n, $1 \leq n \leq N$, we define the projection $\overline{Y_n} \in R^{(D \cdot D) \times 1}$ of the kernel $Y(n, \bullet, \bullet, \bullet)$ as $\overline{Y_n} = \Pi(Y(n, \cdot, \cdot, \cdot))$. Furthermore, we also consider a bijective function $$\Psi: R^{H \times W \times I} \to R^{(H \cdot W) \times I} \quad (3)$$

and denote $\overline{X} = \Psi(X)$. Since rank $\overline{Y_n} = 1$, we know that the matrix $\overline{Z_n} \in R^{(D \cdot D) \times (H \cdot W)}$, $\overline{Z_n} = \overline{Y_n} \overline{X}^T$ also has rank one. In addition, $\overline{Z_n} \geq 0$ as well. Furthermore, for each dot product $<X(i+d1,j+d2,\cdot), Y(n,d1,d2,\cdot)>$ in equation (1) there exist indices $(k_1, k_2)$ such that $\overline{Z_n}(k_1,k_2) = <X(i+d_1,j+d_2,\cdot), Y(n,d_1,d_2,\cdot)>$. Hence, the values of all the dot products needed for computing the convolution output $Z_n = Z(n, \bullet, \bullet)$ are contained in the matrix $\overline{Z_n}$.

Therefore, if we can derive a method for fast computation of the matrix $\overline{Z_n}$, that would, in turn, accelerate the computation of the convolution output tensor Z. To accomplish that goal we propose computing $\overline{Z_n}(k_1,k_2)$ only for a small sample of indices $\Omega_n$. Then, we can use the information contained in $\overline{Z_n}(k_1,k_2)$, $(k_1,k_2) \in \Omega_n$ to infer all entries of $\overline{Z_n}$. In order to do that, we need the sample size to satisfy $|\Omega_n| \geq D \cdot +H \cdot W$, and at least one element needs to be sampled for each row and each column of $\overline{Z_n}$. Then, we know that there exist vectors $u \in R^{D \cdot D}$ and $v \in R^{H \cdot W}$ such that $\overline{Z_n} = uv^T$. Formally, u and present an optimal solution of the following optimization problem, $$\min_{u, v} \sum_{(k_1, k_2) \in \Omega_n} \left\| \overline{Z_n}(k_1, k_2) - u(k_1) * u(k_2) \right\|^p \quad (5)$$

where $p \in R$, $p \geq 1$. In some cases, formulation (5) results in an indefinite Hessian of the objective function, and therefore remains computationally intractable even for the case when p=1 or p=2. The issue can be overcome by transforming problem (5) into an equivalent and computationally tractable formulation as follows, $$\min_{u, v} \sum_{(k_1, k_2) \in \Omega_n} \left\| \log \overline{Z_n}(k_1, k_2) - u(k_1) * u(k_2) \right\|^p \quad (6)$$

Then, the matrix $\overline{Z_n}$ is inferred as $\overline{Z_n} = \exp(u^*)\exp(v^*)^T$. When p=1, problem (6) presents a linear programming problem which can be solved efficiently. However, that would also require the use of a linear programming solver, which may not always be readily available. Still, when p=2 problem (6) has a smooth quadratic objective function. In that case, we can find a closed form for the optimal solution (u*, v*) using the Karush-Kuhn-Tucker optimality conditions. More specifically, $$\begin{bmatrix} u^* \\ v^* \end{bmatrix} = (A_n^T A_n)^{-1} A_n^T vec(\log \overline{Z_n}(\Omega_n)) \quad (7)$$

where the matrix $A_n \in \{0, 1\}^{|\Omega n| \times (D \cdot D + H \cdot W)}$ is the equation matrix corresponding to the objective function of problem (6). Thus, when p=2 we can solve problem (6) without the use of a third-party solver. In addition, we can pre-compute the matrix $M_n = (A_n^T A_n)^{-1} A_n^T$ in advance. In that case, solving the matrix completion problem (6) reduces to a single matrix-vector multiplication which can be done efficiently and reliably at runtime. Furthermore, such an approach is fast and easy to implement. In addition, we can use the same matrix sample $\Omega_n$ for all different output channels $1 \leq n \leq N$. In that case we only need to compute and store a single matrix M such that $M = M_n$, $1 \leq n \leq N$. The proposed method can be used for various other partitions of the convolutional kernel Y. For instance, we can combine multiple output channels into a single matrix $\overline{Z_n}$, or use multiple matrices $\overline{Z_n}^1$, $\overline{Z_n}^2$ ... for a single output channel $1 \leq n \leq N$. In practice, we use the latter option since it allows us to achieve a balance between computational speed, memory requirements, model size, and numerical performance.

Continuing, at operation 920, the neural network engine 615 generates convolution output using the low-rank matrix approximation in the convolutional neural network, as described. Further, in some example embodiments, at operation 920 the input image is resized by half as described above.

Figure 10:
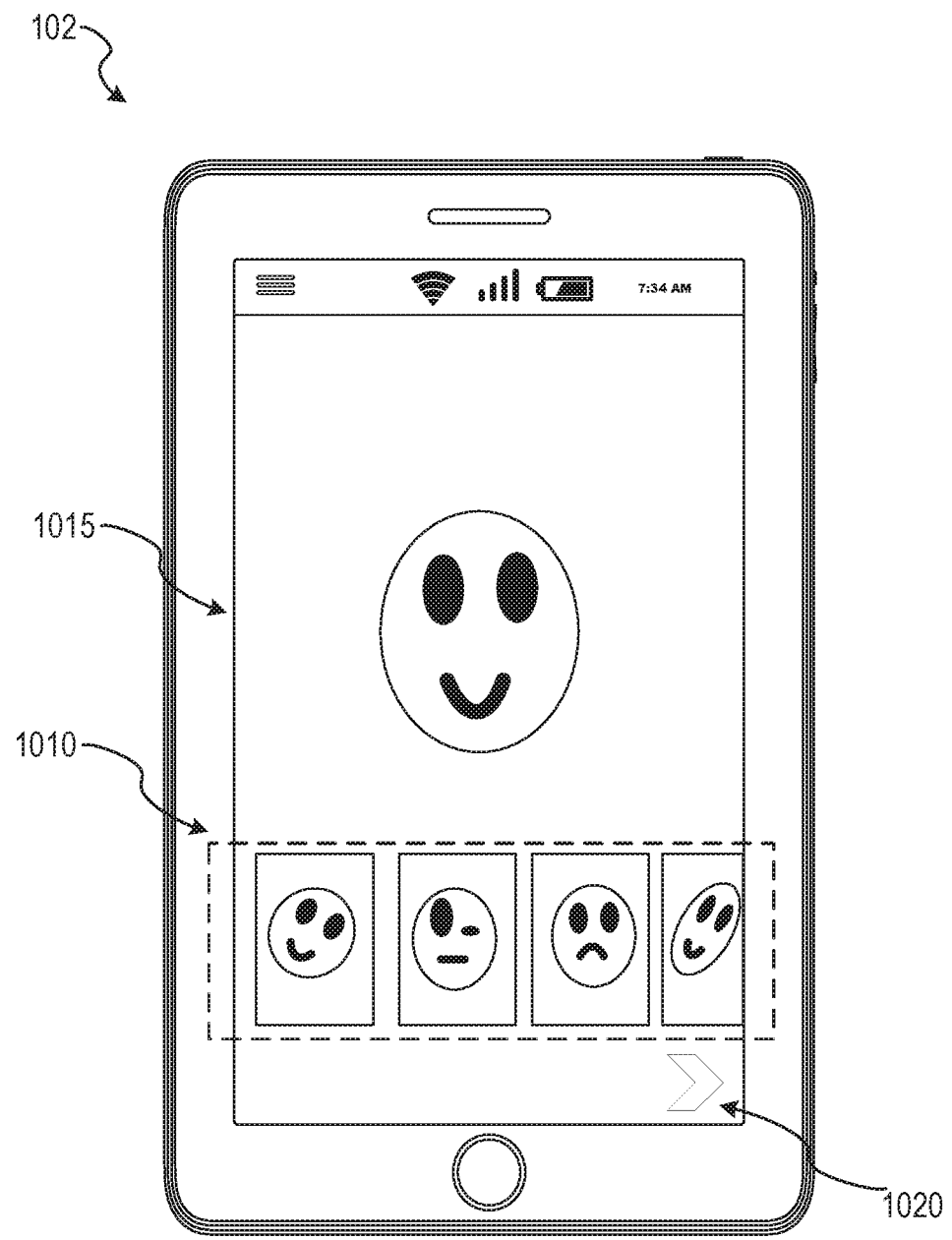
FIG. 10 shows an example embodiment of the client device implemented as a tablet computer, according to some example embodiments.

FIG. 10 shows an example embodiment of the client device 102 implemented as a tablet computer, according to some example embodiments. In the example of FIG. 10, the client device 102 is displaying an embodiment of messaging client application 104 to capture, annotate/modify, and share images. The messaging client application 104 uses a backside camera (not depicted) to capture an image 1015 of an example face. Upon generating or saving the image 1015, the neural network engine 615 can process the image 1015 in the background while the user browses other areas of the messaging client application 104 or other applications. The user can later display the staging area and select the image 1015 of the face for display. Upon image 1015 of the face being displayed, different display options in the form of thumbnails 1010 can be displayed with the image 1015. Each of the thumbnails is a stylized version of the image 1015 created by the neural network engine 615. When the user selects one of the thumbnails 1010, the selected stylized image is displayed instead of image 1015 on the display screen of client device 102. The user can further annotate the selected thumbnail and optionally share it as an ephemeral message, e.g., ephemeral message 502, by selecting the share button 1020.

Figure 11A:
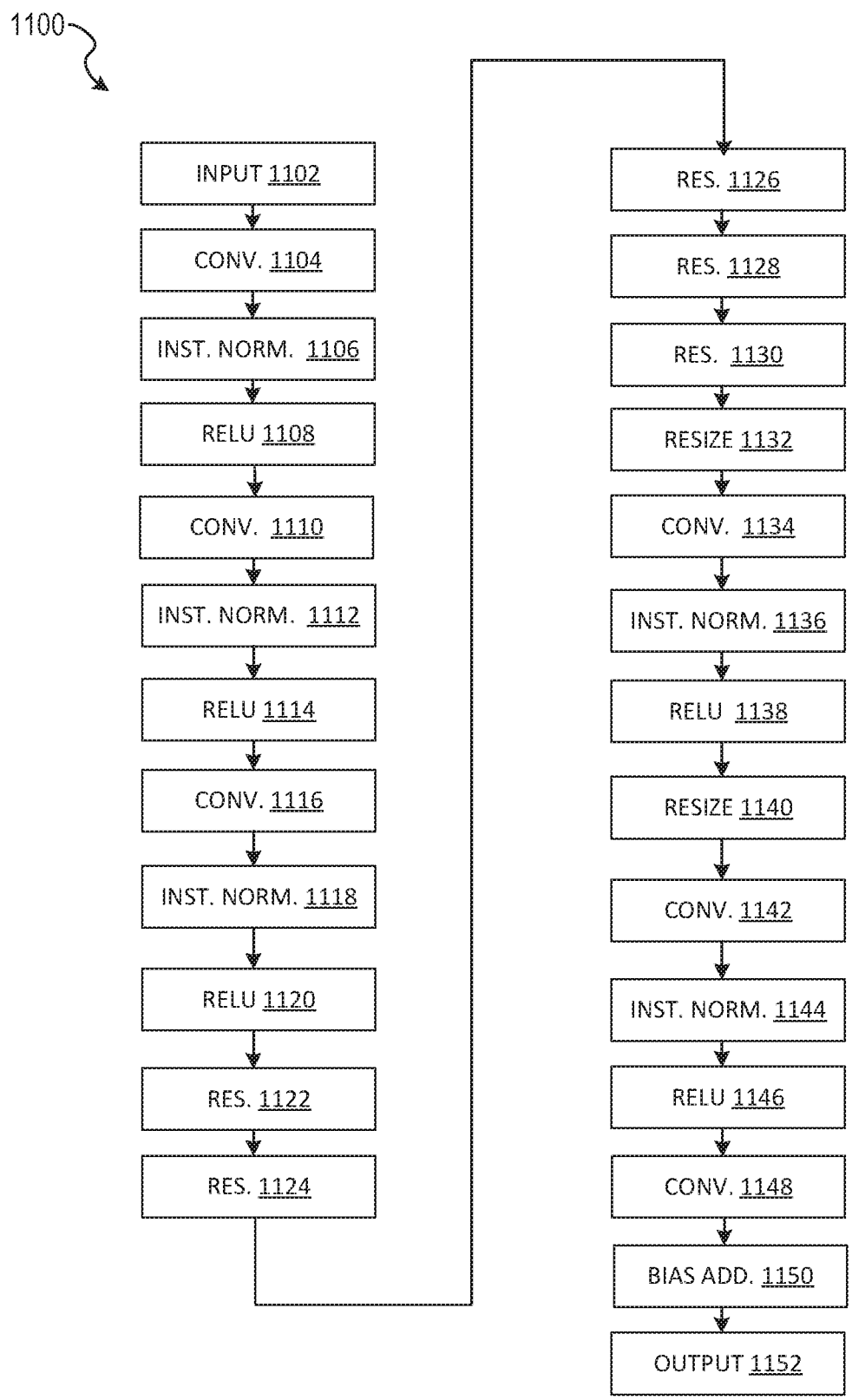
FIG. 11A shows an example flow architecture for a neural network engine, according to some example embodiments.

FIG. 11A shows an example flow architecture for a neural network engine 615, according to some example embodiments. The layers process data and output data into the next layer for further processing. For example, as illustrated:

Layer 1102 is an input layer that receives an image for style transfer processing. For example, the image input into layer 1102 may be captured by client device 102 (e.g., image 1015 in FIG. 10).

Layer 1104 is a 3×3×3×8 full rank convolution layer (e.g., a convolutional neural network), that uses a stride of 1, according to some example embodiments.

Layer 1106 is an instance normalization layer.

Layer 1108 is a REctified Linear Unit (RELU) layer.

Layer 1110 is a 3×3×3×16 full rank convolution layer that is configured to use a stride of 2, according to some example embodiments.

Layer 1112 is an instance normalization layer.

Layer 1111 is a RELU layer.

Layer 1116 is a convolution layer.

Layer 1118 is an instance normalization layer.

Layer 1120 is a RELU layer.

Layers 1122-1130 are residual block layers, with a size of 3×3×32×32, according to some example embodiments. An example of a residual block is discussed with reference to FIG. 11B below.

Layer 1132 is a resiting layer. In some example embodiments, layer 1132 bilinearly resizes data from the previous layer to 2H×2W size.

Layer 1134 is a 3×3×32×16 convolution layer, with a rank of 8 and a stride of 1, according to some example embodiments.

Layer 1136 is a instance normalization layer.

Layer 1138 is a RELU layer.

Layer 1140 is a resizing layer. In some example embodiments, layer 1140 bilinearly resizes data from the previous layer to 2H×2W size.

Layer 1142 is a 3×3×16×8 convolution layer, with a rank of 8 and a stride of 1 according to some example embodiments.

Layer 1144 is an instance normalization layer.

Layer 1146 is a RELU layer.

Layer 1148 is a 3×3×8×3 full rank convolution layer, with a stride of 1.

Layer 1150 is a bias addition layer.

Layer 1152 is an output layer that outputs the processed image in a new style. For example, layer 1152 may output one of the thumbnails of 1010 in FIG. 10.

Figure 11B:
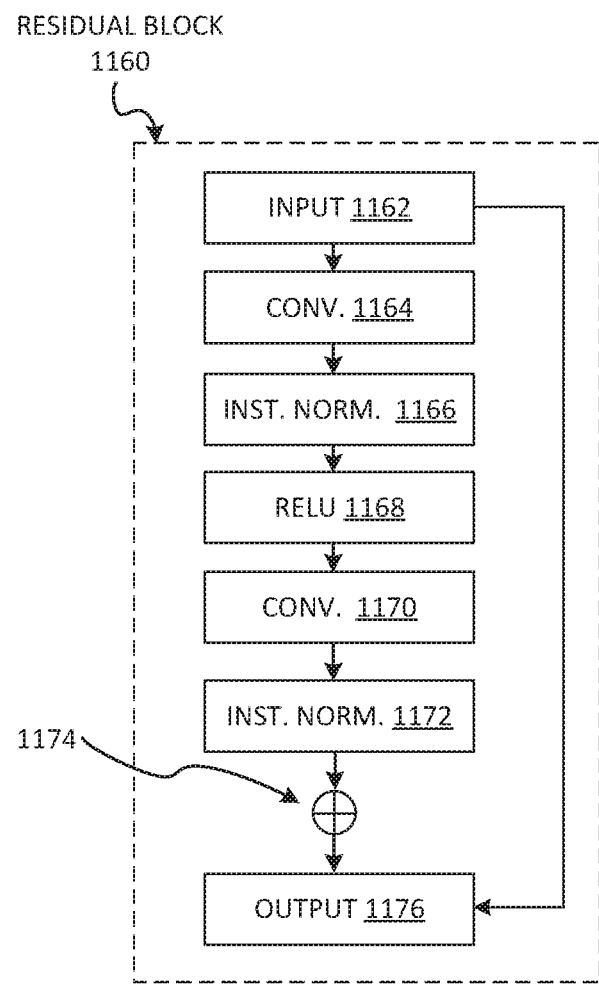
FIG. 11B is an example of a residual block, according to some example embodiments.

FIG. 11B is an example of a residual block 1160, according to some example embodiments. The residual block 1160 is an example of residual block layers 1122-1130. As illustrated, input layer 1162 receives the data output by a previous layer. Layer 1164 is a convolution layer. Layer 1166 is an instance normalization layer. Layer 1168 is a RELU layer. Layer 1170 is a convolution layer. Layer 1172 is an instance normalization layer. The output of layer 1172 is combined with the data input into layer 1162 at an addition operator 1174. The data from the addition operator 1174 is passed to the output layer 1176, which outputs into the next layer (e.g., another residual block) for further processing.

Figure 12:
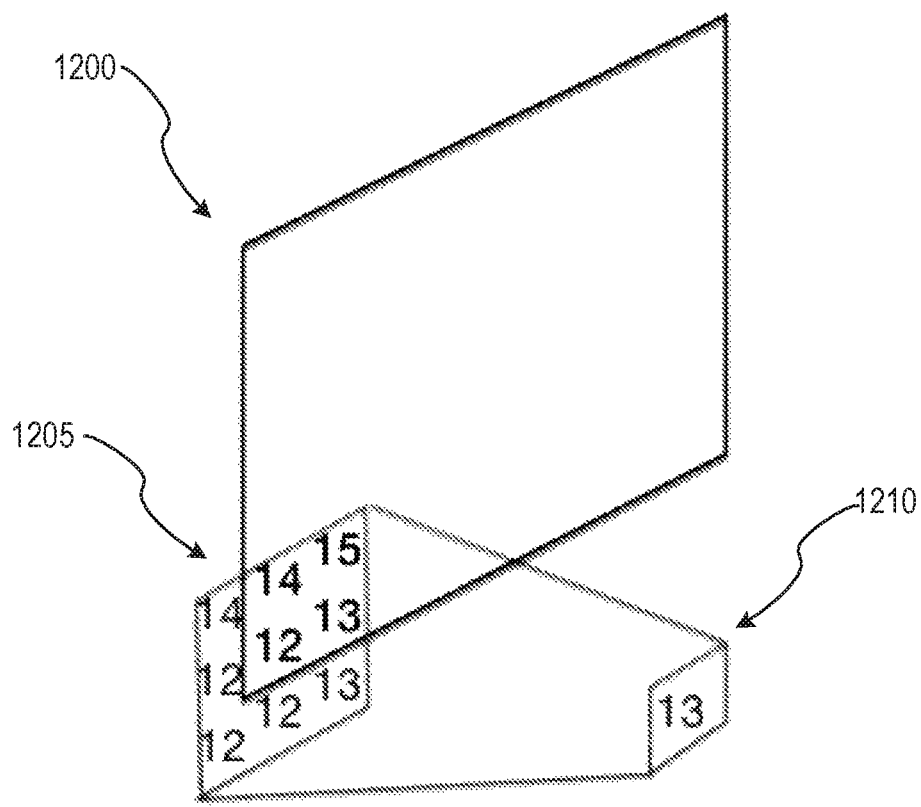
FIG. 12 shows an approach for avoiding edge artifacts when implementing the convolutional operator in the convolutional neural networks, according to some example embodiments.

FIG. 12 shows an approach for avoiding edge artifacts when implementing the convolutional operator in the convolutional neural networks, according to some example embodiments. As illustrated in FIG. 12, a convolution kernel matrix 1205 is moved over the input feature map 1200 (e.g., an image) to produce an output element 1210. In some past approaches, the area of the kernel that is outside the input feature map is padded with zeros. However, padding with zeros can cause unwanted image artifacts around the edges of the resulting image. According to some example embodiments, to avoid edge artifacts due to the zero elements, each element of the kernel matrix 1205 that is outside the input feature map 1200 has a value of the closest element that is inside the input feature map 1200. For example, the top left element in kernel matrix 1205 is assigned "14", because the closest element, the top center element, has a value of "14". Likewise, three of the elements have a value of "12" as their closest element inside the feature map, and the bottom right hand element in kernel matrix 1205 is 13 for similar reasons.

Figure 13:
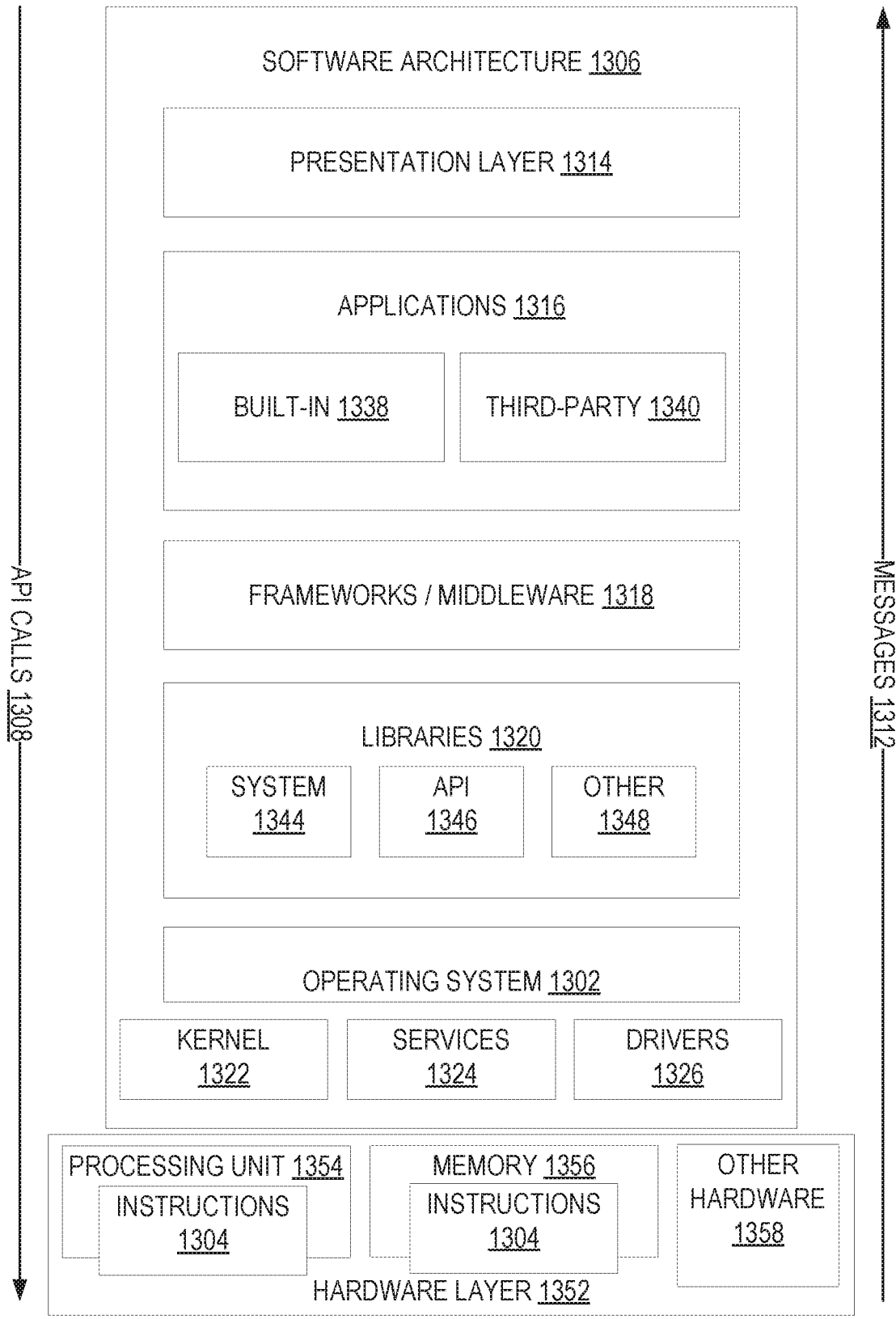
FIG. 13 is a block diagram illustrating a representative software architecture, which may be used in conjunction with various hardware architectures herein described.

FIG. 13 is a block diagram illustrating an example software architecture 1306, which may be used in conjunction with various hardware architectures herein described. FIG. 13 is a non-limiting example of a software architecture, and it will be appreciated that many other architectures may be implemented to facilitate the functionality described herein. The software architecture 1306 may execute on hardware such as a machine 1400 of FIG. 14 that includes, among other things, processors 1410, memory/storage 1430, and input/output (I/O) components 1450. A representative hardware layer 1352 is illustrated and can represent, for example, the machine 1400 of FIG. 14. The representative hardware layer 1352 includes a processing unit 1354 having associated executable instructions 1304. The executable instructions 1304 represent the executable instructions of the software architecture 1306, including implementation of the methods, components, and so forth described herein. The hardware layer 1352 also includes a memory/storage 1356, which also has the executable instructions 1304. The hardware layer 1352 may also comprise other hardware 1358.

In the example architecture of FIG. 13, the software architecture 1306 may be conceptualized as a stack of layers where each layer provides particular functionality. For example, the software architecture 1306 may include layers such as an operating system 1302, libraries 1320, frameworks/middleware 1318, applications 1316, and a presentation layer 1314. Operationally, the applications 1316 and/or other components within the layers may invoke API calls 1308 through the software stack and receive a response in the form of messages 1312. The layers illustrated are representative in nature and not all software architectures have all layers. For example, some mobile or special-purpose operating systems may not provide a frameworks/middleware 1318, while others may provide such a layer. Other software architectures may include additional or different layers.

The operating system 1302 may manage hardware resources and provide common services. The operating system 1302 may include, for example, a kernel 1322, services 1324, and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers. Bluetooth® drivers, flash memory drivers, serial communication drivers (e.g., Universal Serial. Bus (USB) drivers), Wi-Fi® drivers, audio drivers, power management drivers, and so forth depending on the hardware configuration.

The libraries 1320 provide a common infrastructure that is used by the applications 1316 and/or other components and/or layers. The libraries 1320 provide functionality that allows other software components to perform tasks in an easier fashion than by interfacing directly with the underlying operating system 1302 functionality (e.g., kernel 1322, services 1324 and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media formats such as MPEG4, H.264, MP3, .AAC, AMR, JPG, or PNG), graphics libraries (e.g., an. OpenGL framework that may be used to render 2D and 3D graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1316 and other software components/modules.

The frameworks/middleware 1318 provide a higher-level common infrastructure that may be used by the applications 1316 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1316 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. The third-party applications 1340 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1340 may invoke the API calls 1308 provided by the mobile operating system (such as the operating system 1302) to facilitate functionality described herein.

The applications 1316 may use built-in operating system functions (e.g., kernel 1322, services 1324, and/or drivers 1326), libraries 1320, and frameworks/middleware 1318 to create user interfaces to interact with users of the system. Alternatively, or additionally, in some systems, interactions with a user may occur through a presentation layer, such as the presentation layer 1314. In these systems, the application/component "logic" can be separated from the aspects of the application/component that interact with a user.

Figure 14:
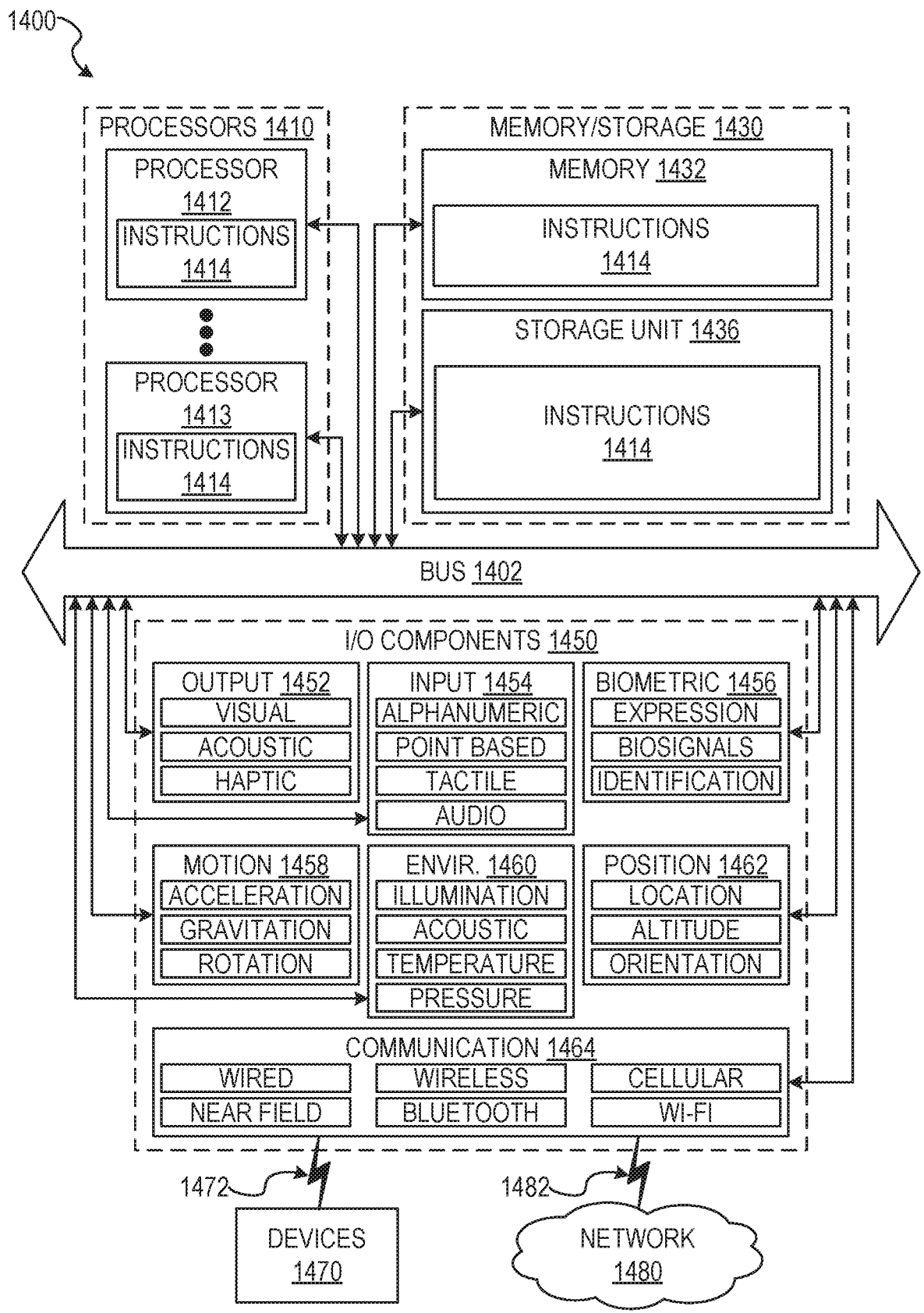
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1414 (e.g., software, a program, an application, an applet, an app, or other executable code) for causing the machine 1400 to perform any one or more of the methodologies discussed herein may be executed. As such, the instructions 1414 may be used to implement modules or components described herein. The instructions 1414 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines that individually or jointly execute the instructions 1416 to perform any one or more of the methodologies discussed herein.

The machine 1400 may include processors 1410, memory/storage 1430, and I/O components 1450, which may bye configured to communicate with each other such as via a bus 1402. The memory/storage 1430 may include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the processor cache memory accessible to processor units 1412 or 1413), or any suitable combination thereof, during execution thereof by the machine 1400. Accordingly, the memory 1432, the storage unit 1436, and the memory of the processors 1410 are examples of machine-readable media.

The I/O components 1450 may include a wide variety of components to receive input, provide output, produce output, transmit information, exchange information, capture measurements, and so on. The specific I/O components 1450 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environment components 1460, or position components 1462 among a wide array of other components. For example, the biometric components 1456 may include components to detect expressions hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1458 may include acceleration sensor components (e.g., accelerometer), gravitation sensor components, rotation sensor components (e.g., gyroscope), and so forth. The environment components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1462 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or other suitable device to interface with the network 1480. In further examples, the communication components 1464 may include wired communication components, wireless communication components, cellular communication components, near field communication (NEC) components, Bluetooth® components (e.g., Bluetooth® Low Energy), Wi-Fi® components, and other communication components to provide communication via other modalities. The devices 1470 may be another machine or any of a wide variety of peripheral devices a peripheral device coupled via a USB).

Moreover, the communication components 1464 may detect identifiers or include components operable to detect identifiers. For example, the communication components 1464 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions 1416 for execution by the machine 1400, and includes digital or analog communications signals or other intangible media to facilitate communication of such instructions 1416. Instructions 1416 may be transmitted or received over the network 1480 using a transmission medium via a network interface device and using any one of a number of well-known transfer protocols.

"CLIENT DEVICE" in this context refers to any machine 1400 that interfaces to a communications network 1480 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1480.

"COMMUNICATIONS NETWORK" in this context refers to one or more portions of a network 1480 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1480 may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message 400 is transitory.

"MACHINE-READABLE MEDIUM" in this context refers to a component, a device, or other tangible media able to store instructions 1416 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1416. The term "machine-readable medium" shall also be taken to include any medium, or combination of multiple media, that is capable of storing instructions 1416 (e.g., code) for execution by a machine 1400, such that the instructions 1416, when executed by one or more processors 1410 of the machine 1400, cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1412 or a group of processors 1410) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1400) uniquely tailored to perform the configured functions and are no longer general-purpose processors 1410. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1412 configured by software to become a special-purpose processor, the general-purpose processor 1412 may be configured as respectively different special-purpose processors (e.g., comprising different hardware components) at different times. Software accordingly configures a particular processor 1412 or processors 1410, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1410 that are temporarily configured (e.g., by software) or permanently configured to perform the relevant operations. Whether temporarily or permanently configured, such processors 1410 may constitute processor-implemented components that operate to perform one or more operations or functions described herein. As used herein, "processor-implemented component" refers to a hardware component implemented using one or more processors 1410. Similarly, the methods described herein may be at least partially processor-implemented, with a particular processor 1412 or processors 1410 being an example of hardware. For example, at least some of the operations of a method may be performed by one or more processors 1410 or processor-implemented components. Moreover, the one or more processors 1410 may also operate to support performance of the relevant operations in a "cloud computing" environment or as a "software as a service" (SaaS). For example, at least some of the operations may be performed by a group of computers (as examples of machines 1400 including processors 1410), with these operations being accessible via a network 1480 (e.g., the Internet) and via one or more appropriate interfaces (e.g., an API). The performance of certain of the operations may be distributed among the processors 1410, not only residing within a single machine 1400, but deployed across a number of machines 1400. In some example embodiments, the processors 1410 or processor-implemented components may be located in a single geographic location (e.g., within a home environment, an office environment, or a server farm). In other example embodiments, the processors 1410 or processor-implemented components may be distributed across a number of geographic locations.

"PROCESSOR" in this context refers to any circuit or virtual circuit (a physical circuit emulated by logic executing on an actual processor 1412) that manipulates data values according to control signals (e.g., "commands," "op codes," "machine code," etc.) and which produces corresponding output signals that are applied to operate a machine 1400. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1410 may further be a multi-core processor 1410 having two or more independent processors 1412, 1414 (sometimes referred to as "cores") that may execute instructions 1416 contemporaneously.

"TIMESTAMP" in this context refers to a sequence of characters or encoded information identifying when a certain event occurred, for example giving date and time of day, sometimes accurate to a small fraction of a second.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SNAP INC., All Rights Reserved.

What is claimed is:

1. A method comprising:
   generating, using one or more processors of a client device, image data using a fully connected neural network layer that outputs the image data into a convolutional layer;
   generating a modified image from the image data using a convolutional neural network, the convolutional neural network configured with the convolution layer having rank one convolution kernel matrices generated using an inferred matrix that is configured to apply an image modification, an output of convolution layer generated at least in part by generating dot products of rank one image matrices from the image data and the rank one convolution kernel matrices; and
   storing the modified image in memory of the client device.

2. The method of claim 1, wherein the image data is from an image generated using an image sensor on the client device; and wherein the method further comprises:
   responsive to generating the image, automatically generating the modified image as a background process on the client device.

3. The method of claim 1, wherein the rank one convolution kernel matrices and the rank one image matrices are separable rank one matrices of a kernel matrix trained to apply the image modification.

4. The method of claim 1, wherein the fully connected neural network layer comprises a REctified Linear Unit (RELU) that generates the image data.

5. The method of claim 1, further comprising publishing the modified image as an ephemeral message on asocial network.

6. The method of claim 1, wherein the image data is generated from a photograph, and the image modification is a conversion to a paint brush style, the convolutional neural network being trained on one or more images that are in the paint brush style.

7. The method of claim 1, wherein the inferred matrix is pre-computed before the image data is generated, and wherein the method further comprises: storing the inferred matrix on the client device.

8. A system comprising:
   one or more processors of a machine; and
   a memory comprising instructions that, when executed by the one or more processors, cause the machine to perform operations comprising:
   generating image data using a fully connected neural network layer that outputs the image data into a convolutional layer;
   generating a modified image from the image data using a convolutional neural network, the convolutional neural network configured with the convolution layer having rank one convolution kernel matrices generated using an inferred matrix that is configured to apply an image modification, an output of convolution layer generated at least in part by generating dot products of rank one image matrices from the image data and the rank one convolution kernel matrices; and
   storing the modified image in the memory.

9. The system of claim 8, wherein the image data is from an image generated using an image sensor; and wherein the operations further comprise: responsive to generating the image, automatically generating the modified image as a background process on the system.

10. The system of claim 8, wherein the rank one convolution kernel matrices and the rank one image matrices are separable rank one matrices of a kernel matrix trained to apply the image modification.

11. The system of claim 8, wherein the fully connected neural network layer comprises a REctified Linear Unit (RELU) that generates the image data.

12. The system of claim 8, the operations further comprising: publishing the modified image as an ephemeral message on a social network.

13. The system of claim 8, wherein the image data is generated from a photograph, and the image modification is a conversion to a paint brush style, the convolutional neural network being trained on one or more images that are in the paint brush style.

14. The system of claim 8, wherein the inferred matrix is pre-computed before the image data is generated, and wherein the operations further comprise: storing the inferred matrix in the memory.

15. A non-transitory computer-readable storage medium comprising instructions that, when executed by one or more processors of a device, cause the device to perform operations comprising:
   generating image data using a fully connected neural network layer that outputs the image data into a convolutional layer;
   generating a modified image from the image data using a convolutional neural network, the convolutional neural network configured with the convolution layer having rank one convolution kernel matrices generated using an inferred matrix that is configured to apply an image modification, an output of convolution layer generated at least in part by generating dot products of rank one image matrices from the image data and the rank one convolution kernel matrices; and storing the modified image.

16. The non-transitory computer-readable storage medium of claim 15, wherein the image data is from an image generated using an image sensor; and wherein the operations further comprise: responsive to generating the image, automatically generating the modified image as a background process.

17. The non-transitory computer-readable storage medium of claim 15, wherein the rank one convolution kernel matrices and the rank one image matrices are separable rank one matrices of a kernel matrix trained to apply the image modification.

18. The non-transitory computer-readable storage medium of claim 15, wherein the fully connected neural network layer comprises a REctified Linear Unit (RELU) that generates the image data.

19. The non-transitory computer-readable storage medium of claim 15, the operations further comprising: publishing the modified image as an ephemeral message on asocial network.

20. The non-transitory computer-readable storage medium of claim 15, wherein the inferred matrix is pre-computed before the image data is generated, and wherein the operations further comprise: storing the inferred matrix in memory.

* * * * *